C. BROWN.
Hay and Straw Cutting Machine.
No. 78,181.
Patented May 26, 1868.
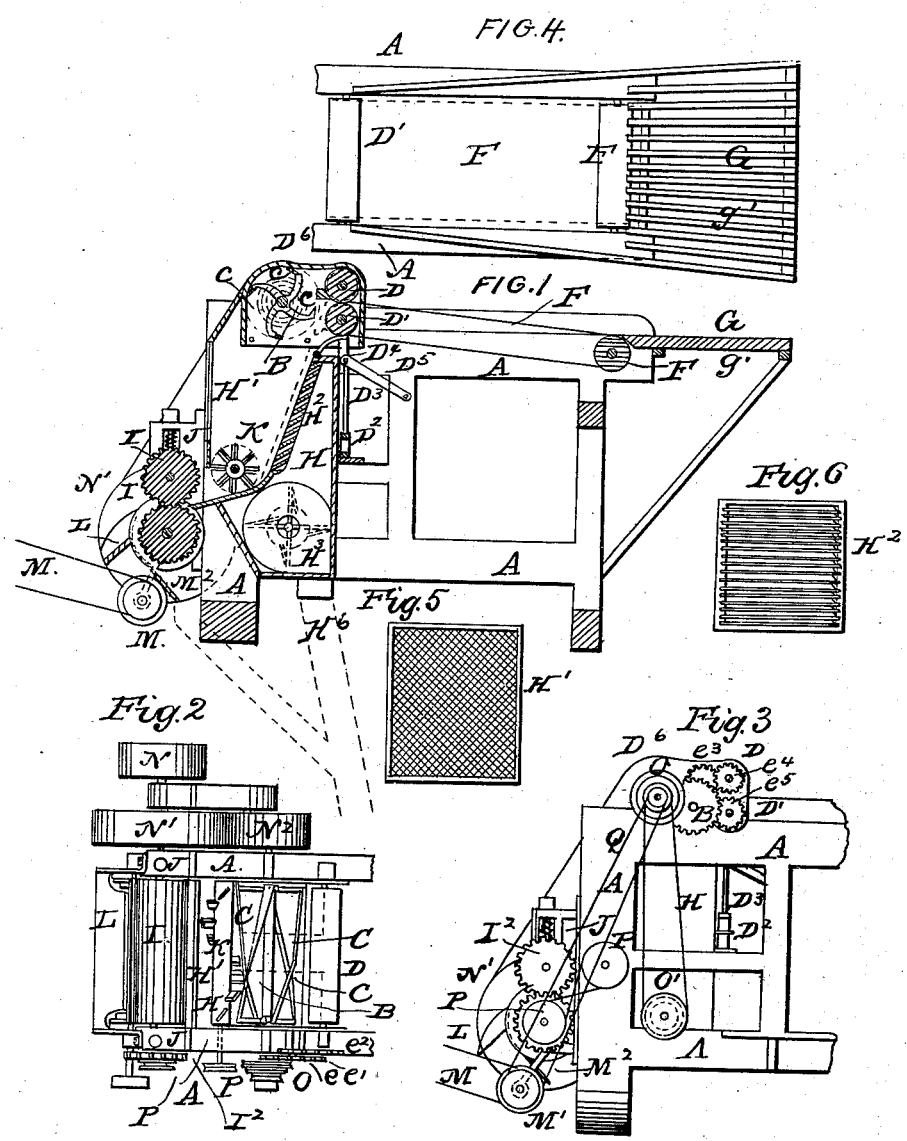
WITNESSES
INVENTOR

United States Patent Office.

CHARLES BROWN, OF BUFFALO, NEW YORK.

Letters Patent No. 78,181, dated May 26, 1868.

---

IMPROVEMENT IN HAY AND STRAW-CUTTING MACHINE.

---

The Schedule referred to in these Letters Patent and making part of the same.

---

TO ALL WHOM IT MAY CONCERN:

Be it known that I, CHARLES BROWN, of the city of Buffalo, county of Erie, and State of New York, have invented a new and improved Hay and Straw-Cutting, Crushing, and Winnowing-Machine; and I do hereby declare the following to be a full, clear, and exact description thereof, reference being had to the accompanying drawings, making a part of this specification.

The nature of my invention consists—

First, in the combination of a cutting-mechanism with a crushing-mechanism, when they are so arranged in relation to each other as that the hay or straw cut by the first will fall to and be acted upon by the second, whereby the cutting and crushing of the haw or straw may be effected by a single handling thereof.

Second, in the combination of a cutting-mechanism with a winnowing or cleaning-mechanism, when they are so arranged as that the hay or straw cut by the first will fall through and be acted upon by the second, whereby the cutting and cleaning of the hay may be effected by a single handling thereof.

Third, in a cleaning-mechanism, composed of a vertical chamber, through which the cut hay falls, the back and front sides of the chamber having apertures to permit the passage of a current of air through the chamber at right angles, or nearly so, to the falling hay, said air-current being produced by an exhausting-fan, arranged in combination with the cleaning-chamber, and separating and carrying off the fine dust, dirt, and grit from the hay.

Fourth, in the combination, with the crushing-rolls, of a dividing or separating-plate, so arranged that as the hay is thrown off from the rolls by centrifugal action, the heavier portions thereof will pass over the plate, while the light chaff will pass under the same, thus effecting the separation of the chaff from the good hay.

Fifth, in a feeding-table, composed of parallel or slightly-diverging slats, laid so as to leave open spaces between, through which small stones, sticks, dirt, &c., may sift from the hay as it falls upon and passes over the same.

Sixth, in the combination of a rotary feeder with the crushing-rolls, to deliver the cut hay uniformly and effectually to the action of said rolls.

In the accompanying drawings—

Figure I is a sectional elevation of my improved machine.

Figure II is a partial plan of same.

Figure III is a partial side elevation of same.

Figure IV is a plan of feed-table and apron.

Figures V and VI are detail views of front and back sides of cleaning-chamber.

Like letters refer to like parts in each of the figures.

A A represent two parallel side frames, of wood, upon and between which are located the various parts of the cutting, cleaning, and crushing-mechanism. B is the cutter-shaft, running in journal-bearings secured to the top rails of the side frames, and carrying at the extremities of radial arms the cutting-knives C C, which cut against the stationary bar or knife $C^1$.

D $D^1$ are feed-rollers, arranged in close proximity to the cutters, the cutting-edge of knife $C^1$ being on line with lower side of upper feed-roller D, which runs in stationary bearings, so that hay, as it enters between the feed-rollers, will pass under the knife $C^1$, and the rotary knives act thereon with an upward cut.

The lower roller, $D^1$, is held against the upper by the yielding pressure of a spring, $D^2$, acting through the rod $D^3$, yoke $D^4$, and radius arms $D^5$, which yielding pressure causes the rollers to seize and carry forward the layer of hay under the ordinary variations in the thickness thereof. The rollers are driven by a series of gears from the cutter-shaft, as shown at $e\ e^1\ e^2\ e^3$, &c., under a common and well-known arrangement for such purpose. Both feed-rollers and cutters are covered by an enclosing case, $D^6$.

The lower roller, $D^1$, further carries one end of an endless belt or apron, F, the opposite end of which is carried by a roller, F¹, with its journals in the side rails of the frames A A. It is upon this belt or apron that the hay is laid and spread out by the operator to present it to the action of the feed-rolls, although it is first received on the feed-rack or table G.

This feed-rack or table is composed of a series of narrow slats, $g^1$, laid parallel to or slightly diverging from each other, with an open space between, through which small stones, sticks, dust, dirt, &c., may sift through and be separated from the hay.

The cutting and feeding-mechanism above described, excepting the feed-table G, is of common and well-known construction, so that a more full and detailed description thereof may be dispensed with.

As the hay is cut it falls into a cleaning-chamber, H, located below the cutters, the sides of the chamber being formed by the side frames A A, or by siding-boards applied thereto, while the front is formed by a wire screen, H¹, Figs. I and V, and the back by a Venetian blind, H², (see Figs. I and VI.) This chamber forms an extension of the cutter-case D⁶.

An exhausting-fan or fans, H³, located in a secondary chamber, H⁴, or other convenient position, from which they may be made to communicate with said chamber, create, by their action, a current of air, entering through the screen H¹, passing across the chamber H, and through the blind, H², and thence through the fan-discharge nozzle, and spout H⁶.

The effect of this current, as it crosses the cut hay falling from the knives, is to separate therefrom and carry with it the fine dust, dirt, and grit, and light, unnutritious matter contained therein, and discharge the same through the fan and spout, H³ H⁶, into a dust-room, or other proper receptacle, while the sound and nutritious straws will, from their greater gravity, fall through the air-current and pass to the action of the crushing-rolls, as will be described. The slats constituting the Venetian blind H² may be made adjustable, so that the spaces or apertures between may be made to regulate the intensity of the air-current, and the consequent efficacy of the cleaning operation.

I I¹ represent the crushing-rollers, supported in cast-iron frames, J, bolted to the front posts of the frames A. The lower roller, I, runs in permanent journal-bearings, while the bearings of the upper roller are formed in boxes sliding in vertical slots in the frames J, with pressure-springs and adjusting-screws above. The two rollers are geared together by long toothed or finger-gears I², the lower one, being the driver. The rollers are located opposite the lower end of the chamber H, the bottom of which is inclined, so as to direct the cut hay into the mouth of the rollers.

In order to insure greater uniformity and certainty in the distribution of the cut hay to the crushing-rollers, a rotary feeder, K, is located near the mouth of the rolls, which catches and throws the cut hay, as it falls on the bottom of the chamber, forward into the mouth of the rolls. This feeder consists simply of a shaft armed with radially-projecting spikes, arranged at regular or irregular intervals thereon.

The rollers being held together by a strong though yielding pressure, will crush and break the stiff straws and stems, and render them soft and pliable, and therefore more easily masticated by the animal to which they may be fed. The surface of the rollers may be either smooth or corrugated, the corrugated surface being preferable, as it acts more effectively.

As the hay issues from the crushing-rollers, the heavier portions thereof will be thrown by centrifugal action from the lower roller on tangential lines, nearly horizontal, while the light chaff will follow the roller and discharge in a more nearly vertical line. Owing to this fact, a dividing-plate, L, located with its surface at an angle of forty-five degrees, or nearly so, and tangent, or nearly so, to the lower roller, will intercept the heavier hay and separate it from the chaff. The good hay, as it passes over the dividing-plate, falls upon a conveyer, M, and is carried thereby to any required place of deposit. The roller M¹, which carries the receiving-end of the conveyer, runs in pendent brackets, M², from the roller-frames J, while the roller carrying the opposite end is supported in any convenient manner at the required place of deposit. The chaff which falls inside of the dividing-plate is carried by a spout, M³, to the dust-room before spoken of, or to any other convenient receptacle.

By carrying the spout M³ into the fan-spout H⁶, at an angle as represented, a slight current of air may be produced therein, which will assist the above-described separation at the roller.

Motion is communicated to the several parts of the above-described mechanism as follows: The shaft of the lower crushing-roller is extended at one end, and carries the main driving-pulley N, to which the motive-power is applied. It also carries a pulley, N¹, from which a belt leads to the pulley N², on one end of the cutter-shaft. Upon the other end of the cutter-shaft is located a cone-pulley, O, from which a belt leads to a similar cone-pulley, O¹, on the fan-shaft, and gives motion to the fan. The use of the cone-pulleys enables the speed of the fan to be regulated at pleasure, so that in connection with the adjustable blinds before described, the intensity of the air-current through the cleaning-chamber may be fully controlled.

The feeder K carries a pulley, P, and is driven by a cross-belt from a pulley, P¹, on the lower crushing-roller shaft. The conveyer is driven by a belt, Q, from a pulley on cutter-shaft.

The utility of cut, crushed, and winnowed hay as an article of food for horses and cattle, and for which Letters Patent were issued to me, September 3, 1867, has been fully demonstrated by experience; and the above-described mechanism is found capable of producing the article very expeditiously, and at small expense.

Having thus described my invention, what I claim, and desire to secure by Letters Patent, is—

1. The combination of the cutting and crushing-mechanism, substantially as described, and for the purpose set forth.

2. The combination of the cutting and cleaning-mechanism, substantially as described, and for the purpose set forth.

3. The vertical cleaning-chambers, with air-apertures in the front and back sides thereof, and exhausting-fan combined therewith, substantially as described, and for the purpose set forth.

4. The dividing and separating-plate L, arranged in the manner and for the purpose set forth.

5. The feed-table G, constructed and arranged as described, for the purpose set forth.

6. The rotary feeder K, arranged and operating as set forth.

CHARLES BROWN.

Witnesses:
W. H. FORBUSH,
VICTOR H. BECKER.